United States Patent [19]

Sarkisian

[11] 4,263,355

[45] Apr. 21, 1981

[54] PAINT SHIELD ROLL

[76] Inventor: Ira Sarkisian, 14180 Pennsylvania, Southgate, Mich. 48195

[21] Appl. No.: 76,367

[22] Filed: Sep. 17, 1979

[51] Int. Cl.[3] ......................... B32B 3/04; B05C 21/00

[52] U.S. Cl. ..................................... 428/124; 118/505; 428/343; 428/906

[58] Field of Search ................ 118/504, 505; 428/124, 428/343, 192, 126, 906

[56] References Cited

U.S. PATENT DOCUMENTS

| | | | |
|---|---|---|---|
| 2,482,977 | 9/1949 | Hendrick | 118/505 |
| 2,954,752 | 10/1960 | Hayward | 118/505 |
| 2,959,152 | 11/1960 | Byers et al. | 118/505 |
| 3,475,259 | 10/1969 | Meserole | 118/504 X |
| 3,528,543 | 9/1970 | Robinsky | 428/906 X |
| 3,752,304 | 8/1973 | Alet | 118/505 X |
| 4,060,947 | 12/1977 | Naka | 428/124 X |

FOREIGN PATENT DOCUMENTS

| | | | |
|---|---|---|---|
| 1400406 | 7/1975 | United Kingdom | 118/504 |

*Primary Examiner*—Morris Kaplan
*Attorney, Agent, or Firm*—Hauke and Patalidis

[57] ABSTRACT

A paint shield for masking the edge of a carpet or of a floor. The paint shield is provided in the form of a roll of a flat strip of thin resilient plastic material which is preformed with a bent over longitudinal edge flange such as to be generally L-shape in section. The strip is rolled flat and springs back to shape when unrolled from the roll. Alternatively, the paint shield is supplied in the form of a rolled pre-scored flat strip, which, when unrolled, is manually shaped to form an edge flange along the score line.

2 Claims, 6 Drawing Figures

FIG. 2
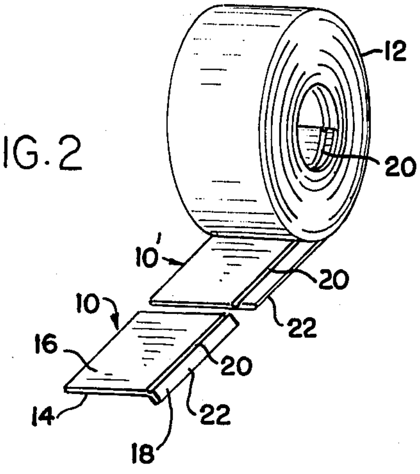
FIG. 1
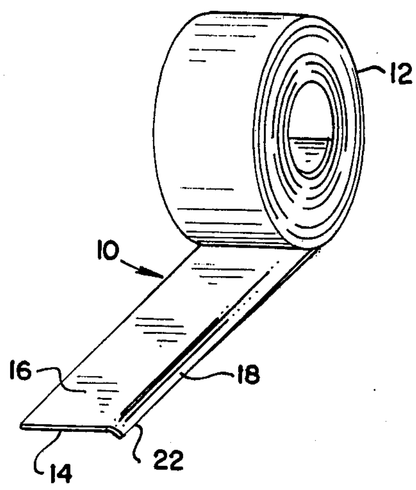
FIG. 3
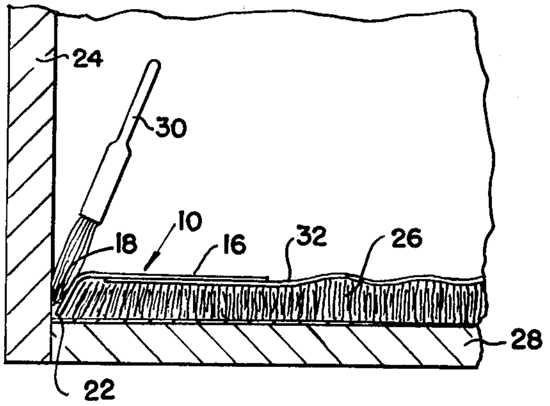
FIG. 5
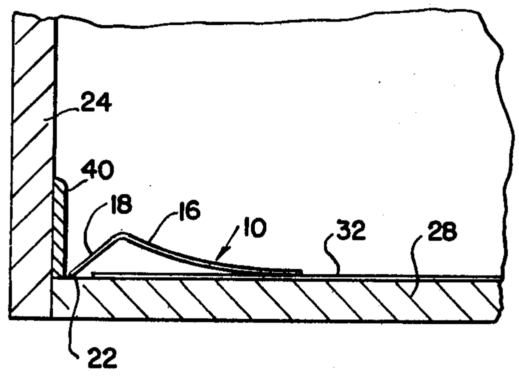
FIG. 4
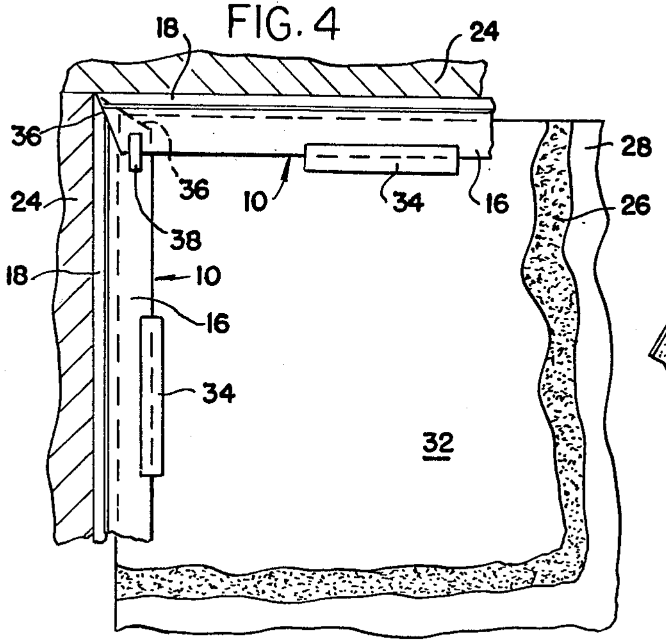
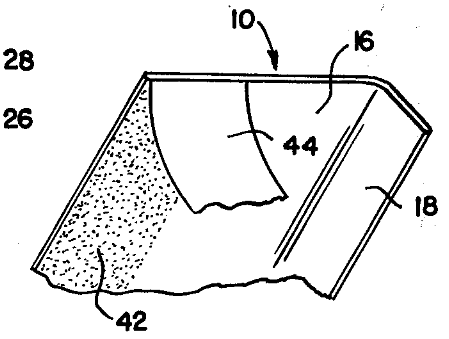
FIG. 6

PAINT SHIELD ROLL

BACKGROUND OF THE INVENTION

Paint shields for masking the edges of carpets or of a floor while painting the bottom portion of an adjoining wall are known, as disclosed, for example, in U.S. Pat. Nos. 695,965 to Taylor et al, 3,693,589 to Knox, 3,788,274 to McNaughton et al and 4,051,808 to Trupp. Such paint shields are in the form of a hand tool, generally shaped as a rectangular plate having a downwardly turned edge flange, the tool being placed at the edge of the floor or carpet, with the edge of the downwardly turned flange engaging the junction between the wall and the floor. As painting progresses, the paint shield is manually displaced along the bottom of the wall such as to shield the carpet or floor at an area corresponding to the area of the bottom of the wall being painted. Such prior art paint shields present the inconvenience that a relatively large portion of the shield is in contact with the carpet, which causes a pronounced drag as the paint shield is manually moved along the junction between the carpet and the bottom of the adjoining wall as painting progresses, some of the paint wetting the shield may drip from the ends of the shield and mar the carpet or floor, they are difficult to use when the carpet is covered with a protective drop cloth as the drag on the drop cloth tends to displace the cloth and, when provided with a handle, their relatively high profile prevents using the shield under furniture, cabinets or low bookshelves, and the handle makes it difficult to paint the portion of the wall opposite the handle.

British patent specification No. 1,400,406 discloses an "Interior Decorators' Aid" in the form of a rigid plastic strip, generally L-shaped in cross-section, which is prescored along transverse lines at 90° to the edge of the strip and at 45° to the edge of the strip, such that the strip may be broken off and mitred in appropriate predetermined lengths. Although the strip material paint shield of the British patent specification remedies some of the inconveniences of the portable manually displaceable paint shields of the prior art, the strip of the British patent specification, being provided with reinforcing ribs and being rigid, is difficult to cut at lengths other than the pre-scored lengths, and comes in lengths which render a byndle of strips difficult to transport and awkward to handle. Due to their length, the strips, after use, are difficult to store if it is desired to salvage them for ulterior re-use.

SUMMARY OF THE INVENTION

The disadvantage of portable hand-held paint shields and or rigid paint shield strips of the prior art are remedied by the present invention which provides paint shields in the form of a long flat strip made of thin, low-cost, pliable plastic material in the form of a roll, which is easily cut to lengths by means of ordinary scissors or shears. The strip of thin pliable plastic material is preformed with a downwardly turned longitudinal edge flange which, because of the resiliency of the material, still permits the strip to be rolled flat and which spontaneously springs back to its performed shape when unrolled. Alternatively, the strip is performed flat with a score line permitting to manually distort and shape the flat strip into a generally L-shape in cross-section, as it is unrolled from the roll. Any length of strip may be thus unrolled from the roll, and easily cut to an appropriate length, and when it is desired to save the strip for ulterior re-use, the lengths of strip may be individually or collectively re-rolled and stored in a relatively small space.

BRIEF DESCRIPTION OF THE DRAWING

These and other advantages of the present invention will become apparent to those skilled in the art when the following description of the best modes contemplated for practicing the invention is read in conjunction with the accompanying drawing wherein like reference numerals refer to like or equivalent parts and in which:

FIG. 1 is a perspective view of a roll of paint shield strip according to the present invention, in the process of being unrolled;

FIG. 2 is a view similar to FIG. 1, but showing a modification thereof:

FIG. 3 is a schematic cross-section through the junction between a room wall and the floor, showing the paint shield strip of the invention in use during painting of the bottom of the wall;

FIG. 4 is a partial top plan view of the paint shield strip of the invention when in use;

FIG. 5 is a view similar to FIG. 3 and showing the paint shield strip of the invention in use for protecting a non-carpeted floor; and FIG. 6 is a bottom perspective view of a further modification of a paint shield strip according to the present invention.

DETAILED DESCRIPTION OF THE PREFERRED EMBODIMENTS

Referring to the drawing, and more particularly to FIG. 1, the paint shield of the present invention is in the form of a long strip 10 supplied tightly rolled in the form of a roll 12. The strip 10 is made of a relatively thin sheet of a plastic material, preferably a thermoplastic which has been extruded or, alternatively, heat-formed to the generally slightly open L-shape illustrated at the end 14 of the strip. The strip 10, in its free form, comprises a relatively flat wide portion 16 terminating proximate a longitudinal edge 22 with a down-turned, relatively narrow, angled edge flange portion 18. The main wide flat portion 16 of the strip 10 forms with the edge flange portion 18 an angle of slightly more than 90° and less than about 145°–150°, preferably of the order of 120°–135°. The strip 10 is thus generally L-shaped in cross-section. The strip 10 is relatively thin, for example, it has a thickness comprised between 0.010 and 0.060 in., and is made of a resilient pliable thermoplastic material such as polystyrene, polyvinyl chloride, low density polyethylene or polypropylene, polyamide, polyester, or polyurethane. The principal requirement is that the plastic material be non-brittle and highly pliable with a good spring-back memory so that, after setting in the appropriate L-shape in section, as shown at the terminal edge 14 of the strip 10, FIG. 1, the formed strip 10 is readily capable of being rolled flat in the form of the roll 12. When being unrolled from the roll 12, the strip 10 naturally springs back to its original shape, consisting of the flat main portion 16 and the angled edge flange 18.

Alternatively, and as illustrated at FIG. 2, the paint guard strip is conveniently supplied at a roll 12 of a flat strip 10' provided with a score line 20, for example in the form of a shallow longitudinal groove 20, formed proximate a longitudinal edge 22 of the strip and parallel to that edge 22. After a measured length of the strip 10' has been unrolled from the roll 12 and cut to length by means of ordinary scissors or shears for example, the lateral bent-over flange 18 may be manually formed with slight finger pressure, the shallow pre-scored line 20 acting as a guide and as an aid as a result of localized reduced strength and stiffness of the material, for bending over the edge flange 18 relatively to the main body portion 16 of the strip, such as to form a strip 10 having a generally L-shape form in transverse section.

Although exact dimensions are not critical, it is convenient to form the strip 10, FIGS. 1 and 2, with a width of the flat main portion 16 of approximately three to eight inches, the bent-over integral flange portion or lip, 18 having a width of approximately one-half inch to one inch.

As schematically illustrated at FIG. 3, the paint shield strip 10 of the invention is conveniently used while painting the bottom of a wall 24, the strip 10 being cut to a length that extends the whole width of the wall and being positioned, as shown, with the main portion 16 of the strip laying over a carpet 26 installed on the floor 28. The edge 22 at the bottom of the down-turned edge flange 18 of the strip 10 is disposed along the junction of the wall 24 and floor 28. The angled edge flange 18 deflects the carpet edge away from the wall 24, as illustrated, such that applying paint, by means of a paint brush 30, to the bottom of the wall 24 may process right to the junction of the wall 24 and floor 28. The strip 10 effectively protects the carpet 26 from being marred by the paint wetting the bristles of the paint brush 30, and effectively protects the carpet from any paint drip. In addition, when it is desired to protect the carpeted area with a drop cloth 32, the main flat portion 16 of the paint shield strip 10 effectively overlaps the edge of the drop cloth 32 and tends to maintain it securely in position.

If so desired, and as illustrated at FIG. 4, a short length of masking tape 34 may be used to more securely apply the strip 10 against the drop cloth 32 and hold the strip and drop cloth in relative fixed position. The ends of the diverse lengths of strip 10, at each corner of a room, are preferably cut at an angle, as shown at 36, which angle is preferably comprised between about 45° and 70°–80°, to the lateral edge 22 of the strip length, such that one strip end may overlap the other, and the strip lengths may be held in position relative to each other also by means of a short length 38 of masking tape. There is no requirements of cutting the ends for perfect mitering, as long as the angle than 45° for permitting overlap of the ends 36, as overlapping the ends presents no inconvenience in view of the thinness of the strip material.

As shown at FIG. 5, the paint shield strip 10 of the invention is also convenient for enabling painting the bottom of a wall 24, or a molding 40, to its juncture with a linoleum-covered, tile-covered, or wooden floor 28. In addition, as the material of which the strip 10 is formed is relatively thin and pliable, by pushing down manually on the strip, it is possible to open the angle formed between the exterior surface of the edge flange 18 with the bottom wall surface, or molding surface, to any appropriate value, thus providing ample space for a paint brush.

The lengths of strip 10 are normally kept in position until the paint dries. After the paint has dried, the strip lengths are removed, and if it is desired to re-use them at a future time, the strips may easily be stored by rolling back into a single roll by superimposing the lengths of strip, or in separate rolls. The strips made according to the structures of FIGS. 1 and 2 revert back to a flat shape when being rolled.

As shown at FIG. 6, at least a partial area of the lower surface of the flat main portion 16 of the paint shield strip 10 may be provided with a coating 42 of an adhesive normally protected by a peelable strip of release paper 44. Such a structure permits to adhesively apply the strip 10 to a drop cloth, to a carpet, or to a floor, for secure holding in position.

Having thus described the present invention by way of structural examples thereof given for illustrative purposes only, what is claimed as new is as follows:

1. A paint strip shield comprising a roll or a relatively thin resilient strip of non-brittle highly pliable plastic material, said strip having a uniform thickness comprised between about 0.010 in. and 0.060 in. and being laterally flat when rolled in said roll and substantially L-shaped in cross-section after unrolling from said roll, said L-shaped strip having a flat relatively wide portion at least three inches in width and a single bent-over edge flange having a width of about one-half inch to one inch, said edge flange being disposed at an angle comprised between 90° and 145° to said flat wide portion and said strip is performed to such substantially L-shape and springs back to said substantially L-shape when unrolled from said rolls.

2. The shield of claim 1 further comprising a coating of adhesive on the lower surface of said strip, and a strip of release paper protecting said coating until use.

* * * * *

UNITED STATES PATENT AND TRADEMARK OFFICE

CERTIFICATE OF CORRECTION

PATENT NO. : 4,263,355

DATED : April 21, 1981

INVENTOR(S) : Ira Sarkisian

It is certified that error appears in the above–identified patent and that said Letters Patent are hereby corrected as shown below:

Col. 1, line 46, change "byndle" to --bundle--.

Col. 4, line 33, change "or" to --of--.

Signed and Sealed this

*Eighteenth* Day of *August 1981*

[SEAL]

*Attest:*

GERALD J. MOSSINGHOFF

*Attesting Officer* *Commissioner of Patents and Trademarks*